United States Patent [19]

Bressers

[11] Patent Number: 4,730,295
[45] Date of Patent: Mar. 8, 1988

[54] APPARATUS FOR READING AND/OR RECORDING A TRACKWISE ARRANGED OPTICAL INFORMATION STRUCTURE

[75] Inventor: Andreas J. M. Bressers, Eindhoven, Netherlands

[73] Assignee: U.S. Philips Corporation, New York, N.Y.

[21] Appl. No.: 839,247

[22] Filed: Mar. 13, 1986

[30] Foreign Application Priority Data

Oct. 14, 1985 [NL] Netherlands .................. 8502802

[51] Int. Cl.⁴ .................................... G11B 7/095
[52] U.S. Cl. .................................. 369/46; 369/44; 369/109; 250/202
[58] Field of Search ............... 369/46, 44, 111, 120, 369/109, 275, 105; 250/202

[56] References Cited

U.S. PATENT DOCUMENTS

| 4,074,314 | 2/1978 | Velzel | 369/46 |
|---|---|---|---|
| 4,209,804 | 6/1980 | Dil | 369/105 |
| 4,363,116 | 12/1982 | Kleuters | 369/44 |
| 4,455,632 | 6/1984 | Broot | 369/46 |
| 4,556,967 | 12/1985 | Broot | 369/109 |
| 4,568,887 | 2/1986 | Bierhoff | 369/46 |

FOREIGN PATENT DOCUMENTS 2120493 11/1983 United Kingdom ............... 369/45

*Primary Examiner*—Alan Faber
*Attorney, Agent, or Firm*—Thomas A. Briody; William J. Streeter; Marianne R. Rich

[57] ABSTRACT

An apparatus for reading and/or recording a trackwise arranged optical structure in a record carrier including a tracking-error detection system with a beam-splitting element and four detectors. The first detector and the second detector cooperate with a first of two sub-beams formed by the beam-splitting element, and the third detector and the fourth detector cooperate with the second sub-beam. It is demonstrated that for larger phase depths of the information details a very suitable tracking signal is obtained by adding the difference between the signals from the first and the second detector to the difference between the signals from the third and the fourth detector.

4 Claims, 4 Drawing Figures

APPARATUS FOR READING AND/OR RECORDING A TRACKWISE ARRANGED OPTICAL INFORMATION STRUCTURE

The invention relates to an apparatus for reding and-/or recording a trackwise arranged optical information structure in a record carrier, which information structure comprises information areas alternating with intermediate areas in the track direction, which apparatus comprises radiation source, an objective system for focussing a beam produced by the radiation source to form a radiation spot on the information structure, and a tracking error detection system for generating a tracking signal containing information on the magnitude and the direction of a deviation between the centre of the radiation spot on the central axis of a track, which detection system comprises a beam-splitting element which is arranged in the path of the beam from the record carrier to form two sub-beams, and four radiation-sensitive detectors arranged along a line transverse to the effective track direction, of which the first detector and the second detector cooperate with a first sub-beam and of which the third detector and the fourth detector cooperate with the second sub-beam, and an electronic circuit for processing the detector signals to form the tracking signal.

Such an apparatus for reading a radiation-reflecting information structure is known, for example from British patent application No. 2,120,493. In the known apparatus a beam-separating element in the form of a polarisation-sensitive or non-polarisation sensitive prism is arranged in the radiation path between the radiation source and the objective system and diverts towards a radiation-sensitive detection system a part of the radiation which has been reflected by the information structure. The beam-splitting element is constituted by a double wedge with a refractive edge which wedge is arranged on the exit face of the prism. Two radiation-sensitive detectors are provided for each of the two sub-beams. The four detectors are situated on a line transverse to the refractive edge of the wedge. If the edge extends parallel to the effective track direction, i.e. the direction of the image of the scanned track formed by the optical elements of the apparatus in a plane through the double wedge and transverse to the optical axis of the apparatus, it is possible to derive a tracking signal from the output signals of the four detectors. This tracking signal is obtained by forming the difference between the sum of the signals from the two detectors which cooperate with the first sub-beam and the sum of the signals from the two detectors which cooperate with the second sub-beam. The tracking signal is employed for correcting the position of the radiation spot relative to the central axis of the track being scanned, so as to minimise the tracking signal.

This tracking method, also referred to as the "push-pull" or differential method because in principle the difference between the intensities in the two halves of the objective pupil is determined, has the advantage that the tracking signal is derived from the beam which also provides the information read-out. This method can be used only if the information areas comprise pits of comparatively small depth in the information surface or hills of comparatively small height on this surface.

For reading an information structure comprising information areas the "central aperture" or integral read method is preferred. This method determines the intensity variation caused by the information areas in the total radiation beam originating from the record carrier and traversing the pupil of the read objective. In order to obtain an optimum "central-aperture" read signal i.e. a signal with a maximum modulation, the depth or height of the information areas must be greater than the depth or height required for an optimum "push-pull" tracking signal. If in a read apparatus the "central-aperture" reading is to be combined with "push-pull" tracking a compromise should be made with respect to the depth or height of the information areas, so that neither the information signal nor the tracking signal can be optimal.

It is the object of the present invention to provide a tracking detection system which is very suitable to be combined with the "central-aperture" information-reading method. To this end the apparatus in accordance with the invention is characterized in that the electronic processing circuit comprises elements for forming a tracking signal which is defined by:

$$S_{r,1} = (S_1 - S_2) + (S_3 - S_4)$$

where $S_1$, $S_2$, $S_3$ and $S_4$ are the output signals of the first, the second, the third and the fourth detector respectively.

As will be demonstrated hereinafter, this signal is maximum for deeper information pits or higher information hills.

The invention is based on the fundamental recognition of the fact that a tracking error not only gives rise to the known intensity difference between the two sub-beams but also to a displacement of each of the sub-beams over the associated detector pair. Since the information structure is scanned by a radiation spot whose diameter is larger than the size of the information details, this structure behaves as a diffraction grating. The higher radial-order beams are the beam of the first and higher orders which are diffracted in a radial direction, i.e. in a direction transverse to the track direction. Within each sub-beam two wavefronts may be distinguished: a first wave front originating from a part of the objective pupil where only a part of the zero-order beam is situated and a second wavefront issuing from a part of the objective pupil where a part of the zero-order beam overlaps a part of a first-order beam. The first wavefront has a constant phase but the phase of the second wavefront is dictated by the depth or height of the information areas and by the position of the radiation spot relative to the central axis of the track. The direction of the resulting wavefront of a sub-beam, i.e. the position where this beam is incident on the associated detector pair, is determined by the position of the radiation spot relative to the central axis of the track for a constant depth or height of the information areas.

A preferred embodiment of the invention is characterized further in that the electronic processing circuit comprises further electronic means for generating a second tracking signal:

$$S_{r,1} = (S_1 + S_2) - (S_3 + S_4).$$

This embodiment is suitable for following both information tracks having a larger depth or height of the information areas and information track having a smaller depth or height of the information areas. A simple switching operation in the electronic processing circuit ensures that always an optimum tracking signal is generated, which is adapted to the height or depth of the information areas.

Preferably, the first and the second tracking signal are formed by partly the same elements in the electronic processing circuit. A preferred embodiment of the invention is characterized further in that the electronic processing circuit comprises elements for additively and subtractively combining the difference between the signals from the first and the fourth detector with the difference between the signals from the second and the third detector.

This embodiment may be characterized further in that the electronic processing circuit comprises a first differential amplifier whose inputs are connected to the outputs of the first and the fourth detector and a second differential amplifier whose inputs are connected to the outputs of the second and the third detector, an adder circuit whose inputs are connected to the outputs of the first and the second differential amplifier and whose output signals constitutes the second tracking signal, and a third differential amplifier whose inputs are connected to the outputs of the first and the second differential amplifier and whose output signal constitutes the first tracking signal.

The output signals of the four detectors may be processed to form a tracking-error signal and an information signal representing the information being read in known manner, inter alia as described in British patent application No. 2,120,493.

Embodiments of the invention will now be described in more detail, by way of example, with reference to the accompanying drawings, in which.

Figure 1:
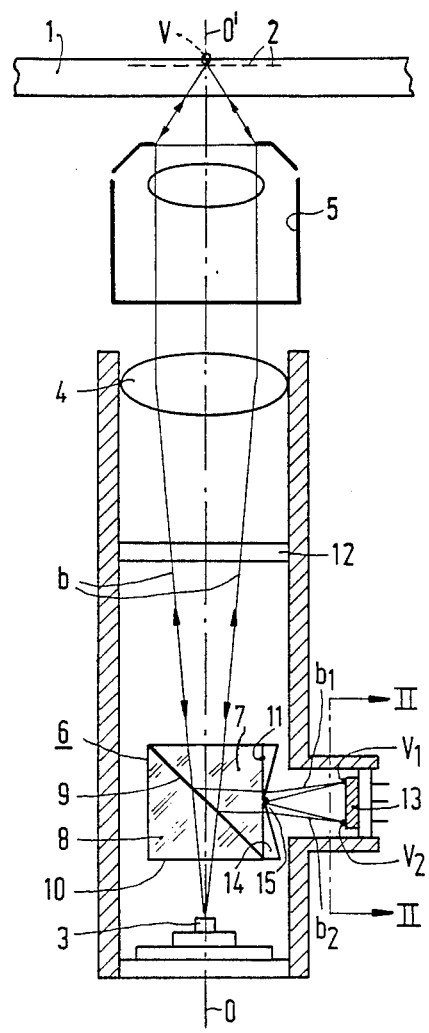
FIG. 1 shows a read apparatus using the invention.

FIG. 1 shows a small part of a round disc-shaped record carrier 1 in radial cross-section. The radiation-reflecting information structure is situated on the upper side of the transparent record carrier and comprises a multitude of information areas, not shown, arranged along information tracks 2. The information structure is scanned by a read beam b produced by a radiation source 3, for example a semiconductor-diode laser. A lens 4 forms the diverging beam into a parallel beam of such cross-section that the pupil of the objective lens 5 is filled correctly. This objective system then forms a tiny radiation spot V on the information structure.

The read beam is reflected by the information structure and, as the record carrier moves relative to the read beam, the reflected beam is time-modulated in conformity with the information stored in the record carrier. In order to separate the modulated beam from the beam emitted by the radiation source a beam-separating prism 6 is arranged between the radiation source and the objective system. This prism may comprise two prismatic elements 7 and 8 between which a beam-splitting layer 9 is situated. The entrance face of the prism 6 is designated 10 and the exit face is designated 11. The layer 9 may be a semitransparent mirror. In order to minimize the radiation loss in the read unit a polarisation-sensitive layer may be employed. A $\lambda/4$ plate 12 should then be arranged between the objective system and the prism, $\lambda$ being the wavelength of the read beam b. This plate is traversed twice by the read beam and rotates the plane of polarisation of this beam through 90° in total. The beam emitted by the radiation source is almost wholly transmitted by the prism, whilst the modulated beam is reflected almost completely towards a radiation-sensitive detecting system 13. This system inter alia supplies a signal which is modulated in conformity with the information stored in the record carrier.

A double wedge 14 having a refractive edge 15 is arranged on the exit face 11 of the prism 6. The radiation-sensitive detection system 13 comprises four detectors which bear the reference numerals 16, 17, 18 and 19 in FIG. 2, which is a sectional view of the detector taken on the line II—II' in FIG. 1.

The edge 15 extends transversely of the optical axis OO' and parallel to the effective track direction, i.e. parallel to the projection of a track in the plane through the edge 15 and transverse to the plane of drawing of FIG. 1.

The double wedge 14 splits the beam b into two sub-beams $b_1$ and $b_2$ which cooperate with the detectors 16, 17 and the detectors 18, 19 respectively. These beams are focussed to form radiation spots $V_1$ and $V_2$ respectively in the plane of the detection system 13, which radiation spots are, in principle, situated symmetrically relative to the detectors 16, 17 and the detectors 18, 19 respectively.

If the centre of the radiation spot V coincides with the central axis of the track being scanned, in other words if no tracking error occurs, the intensity of the beam b is distributed uniformly between the beams $b_1$ and $b_2$, so that the overall radiation intensities of the radiation spots $V_1$ and $V_2$ are equal. The sum of the output signals of the detectors 16 and 17 is then equal to the sum of the output signals 18 and 19. In the case of a deviation between the centre of the radiation spot V and the central axis of the track the intensity of one of the sub-beams is higher than that of the other sub-beams and said sum signals are no longer equal. A tracking signal, reference to as the "push-pull" tracking signal, can then also be obtained, as is known, by comparising these sum signals with each other. If the output signals of the detectors 16, 17, 18 and 19 are $S_{16}$, $S_{17}$, $S_{18}$ and $S_{19}$, this tracking signal is given by:

$$S_{r,2}=(S_{16}+S_{17})-(S_{18}+S_{19}).$$

As already described in inter alia U.S. Pat. No. 4,209,804, the information areas should have a comparatively small depth or height for an optimum information reading and tracking in accordance with the "push-pull" method. If the information areas are to be read by means of the "central-aperture" or integral method are information areas should have a larger depth or height for an optimum information signal, i.e. a signal which is modulated to a maximum extent.

In accordance with the invention the information tracks of a record carrier in which the information areas have a geometry which is optimised for the integral read method can be followed optimally by employing a tracking signal $S_{r,1}$ which is given by:

$$S_{r,1}=(S_{16}+S_{18})-(S_{17}+S_{19}).$$

This is no longer based on the radiation distribution between the radiation spots $V_1$ and $V_2$ but on a phase difference within the sub-beams themselves, between radiation components of these sub-beams, which phase difference depends on the position of the radiation spot V relative to a central axis of the track being read. If this position and also the phase difference, changes, the position of the radiation spot $V_1$ or $V_2$ relative to the detector pair 16, 17 and 18, 19 respectively also changes.

For a better understanding of the invention its physical background will now be explained. The trackwise arranged information structure divided into information areas may be regarded as a diffraction grating which splits the read beam into an undiffracted zero-order beam and a plurality of diffracted first-order and higher-order beams both in the tangential or track direction and in the radial direction. For the purpose of tracking mainly the radially diffracted beams are of interest and from these beams mainly the first-order beams. The numerical aperture of the objective system and the wavelength of the read beam are adapted to the information structure in such a way that the higher-order beams fall largely outside the pupil of the objective system and are not incident on the detectors. Moreover, the amplitudes of the higher-order beams are small relative to the amplitudes of the zero-order beam and the first-order beams.

Figure 3:
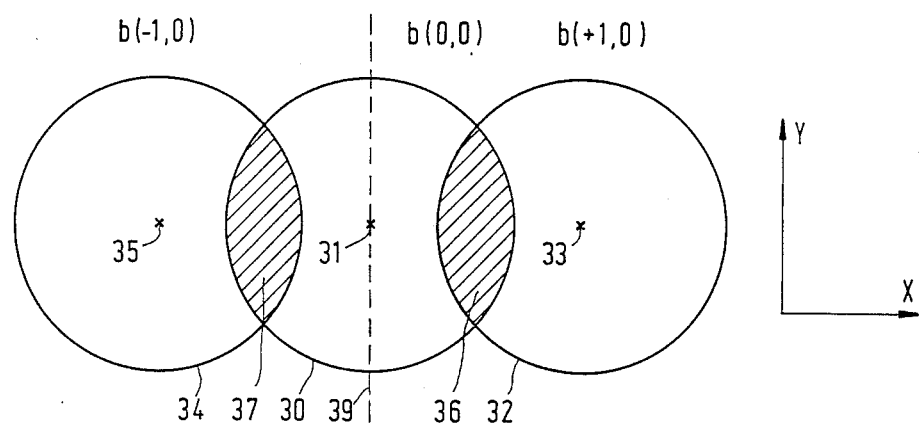
FIG. 3 shows cross-sections of beams of different diffraction orders.

FIG. 3 shows cross-sections of the radially diffracted first-order beams in the plane of the exit pupil of the objective system or an image of this pupil. The circle 30 with the centre 31 represents the exit pupil. This circle also represents the cross-section of the zero-order beam b (0, 0). The circle 32 with the centre 33 and the circle 34 with the centre 35 represent the cross-sections of the first-order beam b(+1, 0) and the first order beam b (−1, 0) respectively. The X-direction corresponds to the radial direction and the Y-direction to the track direction on the record carrier. The distances between the centre 31 of the zero-order beam and the centres 33 and 35 of the first-order beams are determined by $\lambda/q$, where $\lambda$ is the wavelength of the read beam and q the period of the track structure in the radial direction.

For the present method of describing the tracking it is correct to say that in the hatched areas 36 and 37 in FIG. 3 a first-order sub-beam overlaps the zero-order beam and interference occurs. The phases of the first-order beams change if the read spot V moves over the record carrier in a radial direction. As a result of this, the intensities of the parts of the read beam which pass through the areas 36 and 37 will change and the directions of the composite wavefronts of the sub-beams $b_1$ and $b_2$ and hence the positions of the spots $V_1$ and $V_2$ formed by these sub-beams relative to the associated detector pairs will change.

If the centre of the read spot V coincides with the centre of an information area in a track there will be a specific phase difference, referred to as the phase depth $\psi$, between the first-order radial beams b (+1, 0) and b(−1, 0) and the zero-order beam. If the read spot moves from this position in a radial direction the phase of, for example, the beam b(+1, 0) increases by $2\pi r/q$ and that of the beam b(−1, 0) decreases by the same amount. Here r is the radial distance from the centre of the read spot V to the centre of the track. The phase $\phi(+1, 0)$ and $\phi(-1, 0)$ of the beam b(+1, 0) and the beam b(−1, 0) respectively related to the zero-order beam b(0, 0) may be represented by:

$$\phi(+1, 0) = \psi + 2\pi r/q$$

$$\phi(-1, 0) = \psi - 2\pi r/q$$

The double wedge 14 separates the pupil halves along the broken line 31 in FIG. 3 and images these pupil halves onto separate detector pairs, i.e. the hatched part of the beam b(+1, 0) and the right-hand half of the beam b(0, 0) are incident on the detectors 16 and 17 and the hatched part of the beam b(−1, 0) and the left-hand half of the beam b(0, 0) are incident on the detectors 18 and 19. The position-dependent output signals of the detectors may be represented by:

$$S_{16} = A + B \cos(\psi + 2\pi r/q) - C \sin(\psi + 2\pi r/q)$$

$$S_{17} = A + B \cos(\psi + 2\pi r/q) + C \sin(\psi + 2\pi r/q)$$

$$S_{18} = A + B \cos(\psi - 2\pi r/q) + C \sin(\psi - 2\pi r/q)$$

$$S_{19} = A + B \cos(\psi - 2\pi r/q) - C \sin(\psi - 2\pi r/q)$$

where A, B and C are constants which are determined by the amplitudes of the first-order beams relative to those of the zero-order beam and by the angle through which the first-order beams are diffracted relative to the optical axis, i.e. by the radial period of the track structure.

The terms $2\pi r/q$ in the signals $S_{16}$ and $S_{17}$ are preceded by the + sign and those in the signals $S_{18}$ and $S_{19}$ are preceded by the − sign because the detectors 16 and 17 on the one hand and the detectors 18 and 19 on the other hand receive radiation beams originating from different pupil halves.

The signals $S_{16}$, $S_{17}$, $S_{18}$ and $S_{19}$ comprise three terms. The term A is determined by the amplitude of the zero-order beam. The second term, starting with B, is a measure of the intensity in the relevant pupil half, which intensity depends on the depth or height ($\psi$) of the information areas and on the tracking error (r). The last term, beginning with C, is determined by the tracking-error-dependent phase difference within the relevant sub-beams, i.e. by the position on the radiation spot $V_1$ or $V_2$ on the corresponding detector pair 16, 17 or 18 and 19. For the two detectors of one detector pair this term has an opposite sign.

In accordance with the invention the tracking signals $S_{r,1}$ is given by:

$$S_{r,1} = (S_{16} + S_{18}) - (S_{17} + S_{19})$$

or $$S_{r,1} = 4C \cos \psi \cdot \sin 2\pi r/q$$

The amplitude $4 \cdot C \cos \psi$ of this signal is a maximum for $\psi = \pi$ rad. Therefore, this tracking error-detection method is very suitable for use in reading optical record carriers having a phase structure whose information areas have a phase depth of $\pi$ rad. By means of the signal $S_{r,1}$ optimum scanning is also possible of tracks of a record carrier whose information structure is an amplitude structure, i.e. whose information areas have another reflection or transmission coefficient than the surrounding area, to which information areas also a phase depth of $\pi$ rad may be attributed.

Figure 2:
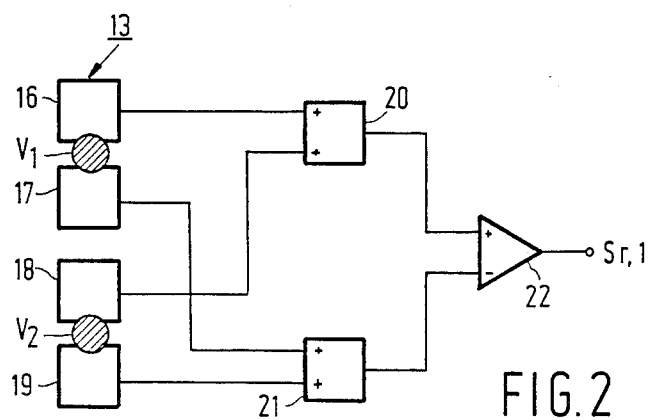
FIG. 2 shows a sectional view of the detectors in this apparatus, taken on the line II—II' in FIG. 1, and shows schematically an example of an electronic processing circuit.

As is shown in FIG. 2, the signal $S_{r,1}$ can be obtained simply by means of two adder circuits 20 and 21 and one subtractor circuit 22.

As already stated, it is also possble to obtain a second, or differential, tracking signal $S_{r,2}$ by means of the detectors 16, 17 18 and 19, which signal is very suitable for following information tracks whose information areas have a phase depth which is considerably smaller than $\pi$ rad, for example $2\pi/3$ rad. This tracking signal is given by:

$$S_{r,2} = (S_{16} + S_{17}) - (S_{18} + S_{19})$$

Figure 4:
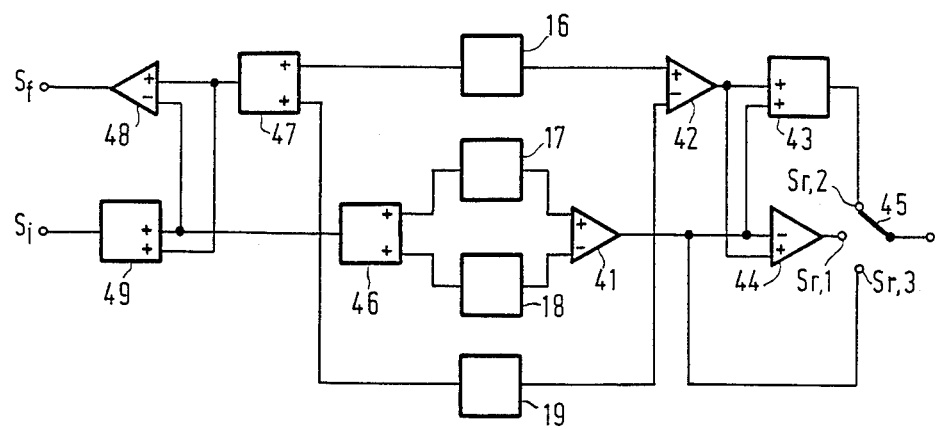
FIG. 4 shows another example of an electronic processing circuit for the detector signals.

This signal may also be represented by:

$$S_{r,2} = (S_{16} - S_{19}) + (S_{17} - S_{18}),$$

while the signal $S_{r,1}$ may also be represented by:

$$S_{r,1} = (S_{16} - S_{19}) - (S_{17} - S_{18}).$$

both signals can be obtained by means of the simple electronic circuit shown in FIG. 4, which comprises only three subtractor circuits 41, 42 and 44 and one adder circuit 43.

In accordance with the invention a third tracking signal $S_{r,3}$ can be derived from the four detector signals, which tracking signal is given by:

$$S_{r,3} = \frac{S_{r,2} - S_{r,1}}{2} = S_{17} - S_{18}, \text{ where}$$

$$S_{17} - S_{18} = 4 \cdot C \cdot (4 \cdot \sin\psi - \cos\psi) \cdot \sin 2\pi r/q.$$

Finally, a fourth tracking signal $S_{r,4}$ can be obtained, which is given by:

$$S_{r,4} = \frac{S_{r,2} + S_{r,1}}{2} = S_{16} - S_{19}, \text{ where}$$

$$S_{16} - S_{19} = 4 \cdot C \cdot (4 \cdot \sin\psi + \cos\psi) \cdot \sin 2\pi r/q.$$

For the most frequently used phase depths of the information areas $(\pi/2) \leq \psi \leq (3\pi/2)$ for which $\cos\psi$ is negative, the signal $S_{r,4}$ is less suitable than the signal $S_{r,3}$.

The signal which suits the phase depth of a specific record carrier can be selected from the tracking signals supplied by the electronic processing circuit as is indicated schematically by the switch 45 in FIG. 4.

The four detectors 16, 17, 18 and 19 may also be used for generating a focussing-error signal $S_f$. As is described in British patent application No. 2,120,493 this signal is given by:

$$S_f = (S_{16} + S_{19}) - (S_{17} + S_{18})$$

As is shown in the left-hand part of FIG. 4, this signal can be obtained by means of two adder circuits 46 and 47 and one differential amplifier 48.

Finally, the information signal $S_i$ is formed by the sum of all the detector signals:

$$S_i = S_{16} + S_{17} + S_{18} + S_{19}.$$

This signal can be obtained for example by means of an additional adder circuit 49.

Although the invention has been described for an apparatus for reading a record carrier, it may also be utilized in a recording apparatus for a record carrier provided with prerecorded optically detectable servo tracks containing addresses. This servo track serves to ensure that a write spot accurately follows a path on the information surface. For further details on such a servo track reference is made to U.S. Pat. No. 4,363,116.

What is claimed is:

1. An apparatus for reading and/or recording a trackwise arranged optical information structure in a record carrier, which information structure comprises information areas alternating with intermediate areas in the track direction, which apparatus comprises radiation source, an objective system for focussing a beam produced by the radiation source to form a radiation spot on the information structure, and a tracking error detection system for generating a tracking signal containing information on the magnitude and the direction of a deviation between the centre of the radiation spot and the central axis of a track, which detection system comprises a beam-splitting element which is arranged in the path of the beam from the record carrier to form two sub-beams, and four radiation-sensitive detectors arranged along a line transverse to the effective track direction, of which the first detector and the second detector cooperate with a first sub-beam and of which the third detector and the fourth detector cooperate with the second sub-beam, and an electronic circuit for processing the detector signals to form the tracking signal, characterized in that the electronic processing circuit comprises elements for forming a tracking signal which is defined by:

$$S_{r,1} = (S_1 - S_2) + (S_3 - S_4)$$

where $S_1$, $S_2$, $S_3$ and $S_4$ are the output signals of the first, the second, the third and the fourth detector respectively.

2. An apparatus as claimed in claim 1, wherein the electronic processing circuit comprises means for generating a second tracking signal $S_{r,2}$ which is given by:

$$S_{r,2} = (S_1 + S_2) - (S_3 + S_4).$$

3. An arrangement as claimed in claim 2, wherein the electronic processing circuit comprises elements for additively and subtractively combining the difference between the signals from the first and the fourth detector with the difference between the signals from the second and the third detector.

4. An apparatus as claimed in claim 3, wherein the electronic processing circuit comprises a first differential amplifier whose inputs are connected to the outputs of the first and the fourth detector, and a second differential amplifier whose inputs are connected to the outputs of the second and the third detector, an adder circuit whose inputs are connected to the outputs of the first and the second differential amplifier and whose output signal constitutes the second tracking signal, and a third differential amplifier whose inputs are connected to the outputs of the first and the second differential amplifier and whose output signal constitutes the first tracking signal.

* * * * *